United States Patent
Langford et al.

(10) Patent No.: US 6,470,450 B1
(45) Date of Patent: Oct. 22, 2002

(54) METHOD AND APPARATUS FOR CONTROLLING APPLICATION ACCESS TO LIMITED ACCESS BASED DATA

(75) Inventors: Glenn C. Langford, Kanata (CA); Ronald J. Vandergeest, Kanata (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/220,247

(22) Filed: Dec. 23, 1998

(51) Int. Cl.[7] .................................................. H04L 9/32
(52) U.S. Cl. ...................................................... 713/182
(58) Field of Search ................................. 713/182, 187, 713/188, 193, 194, 155, 164, 165, 167

(56) References Cited

U.S. PATENT DOCUMENTS

| | | |
|---|---|---|
| 5,638,446 A | 6/1997 | Rubin |
| 6,047,242 A * | 4/2000 | Benson .......................... 702/35 |
| 6,272,631 B1 * | 4/2001 | Thomlinson et al. ......... 713/155 |

OTHER PUBLICATIONS

"Security Grows Up: The JDK 1.2 Security Model", Rich Levin, java.sun.com, Nov., 1998.

* cited by examiner

Primary Examiner—Matthew Smithers
(74) Attorney, Agent, or Firm—Vedder, Price, Kaufman & Kammholz

(57) ABSTRACT

An application registration data generator, on a per application basis, generates application registration data that contains at least application identification data, such as, the name of a software application or a pathname to a software application, and stored unique application verification data that is based on executable file data. A data access determinator determines whether a calling application should be allowed access to the limited access based data by, for example, computing a hash value of the executable file and checking whether this hash value matches the corresponding stored unique application verification data. If there is a match, the application is granted access to the user's cryptographic parameters, privilege data, or other limited access based data on a per application basis.

44 Claims, 4 Drawing Sheets

METHOD AND APPARATUS FOR CONTROLLING APPLICATION ACCESS TO LIMITED ACCESS BASED DATA

RELATED CO-PENDING APPLICATION

This is a related application to co-pending application entitled "Method for Controlling Program Execution and Program Distribution", Ser. No. 09/220,246, filed on even date.

FIELD OF THE INVENTION

The invention relates generally to systems that employ information security algorithms, and more particularly to systems and methods for controlling software application access to limited access based data, such as cryptographic security keys.

BACKGROUND OF THE INVENTION

Many of today's computer systems and communication systems employ some type of information security system such as a public key cryptography system or other cryptographic based security system to either encrypt information communicated among applications or to other units within the system, or to digitally sign documents as a method of electronic commerce or for other suitable purpose. Information security systems are often used by multiple software applications, for example, an e-mail application may use public/private key cryptographic programs to allow the encryption of electronic mail or digital signing of electronic mail. Similarly, other software applications such as financial transaction applications that allow a user to digital sign, for example, electronic contracts or purchase orders to carryout financial transactions, may also use the same public public/private key infrastructure as the e-mail application and other applications within the system. In a public/private key based cryptography system as known in the art, a private signing key and a private decryption key may be stored in an encrypted secret file in each computer corresponding to a user of the computer. The user typically has to login on the computer to gain access to the secret key information by entering a specific password, or through another mechanism, each time the security system needs to be used. As such, when multiple applications are being used by a user, a login requirement on a per application basis for use of the security system becomes cumbersome, although it can provide a high level of security from unauthorized access.

In other known computer systems using information security systems, a single login by the user can be used wherein subsequent applications are allowed access to the secret key information stored in the file. When a login or use is requested by a different application, the application retrieves the stored login information and obtains it automatically. A problem arises with such systems when rogue software applications may be attempting access to a computer either in a foreground or background mode. Since the system allows access by any application seeking use of the cryptographic system, protected credentials such as secret decryption keys and signing keys can be obtained without the user's knowledge. As a result, an unauthorized party may use a rogue application to obtain a secret signing key to digitally forge documents or decrypt important documents that were originally encrypted only for receipt by a specific user. The rogue application can attempt and obtain access, by being downloaded, for example, from a worldwide computer network.

In an attempt to overcome such problems, a code-signing scheme has been developed to help ensure that a specific software application is a legitimate application. For example, when a manufacturer releases a new software application, or new version of a previously released application, over a public network, the manufacturer digitally signs the software application with a signature that is trusted by the receiving unit in the network through the use of, for example, certificate authorities, as known in the art. As such, a computer node or other communication unit may determine that the application is not a virus or a rogue software application. Code signing schemes generally involve an executable file being digitally signed by a trusted authority and the signature is verified by a computer unit before the program is run. However, these schemes do not typically involve access to limited access based data, such as a user's secret signing key or decryption key. A problem with such systems is that an operating system or other application cannot prevent code signed applications from accessing digital signing keys or other cryptographic keys for information that may not be necessarily needed by an application. Hence, no personal security data is protected. A user of a node or software application within a given node does not have the ability to decide whether access to cryptographic keys or other limited access based data should be restricted. In addition, all of the trust is in the manufacturer or the entity signing the application.

Other computer systems are known that have mechanisms that allow a user to grant or deny specific applications access to peripheral devices such as hard disks and to limit access to networks. However, such systems do not typically involve providing access to a user's limited access based data for a number of different software applications.

Consequently there exists a need for a system and method for controlling application access to limited access based data, such as security parameters including private keys and other security-related information.

DETAILED DESCRIPTION OF THE PREFERRED EMBODIMENT

Figure 1:
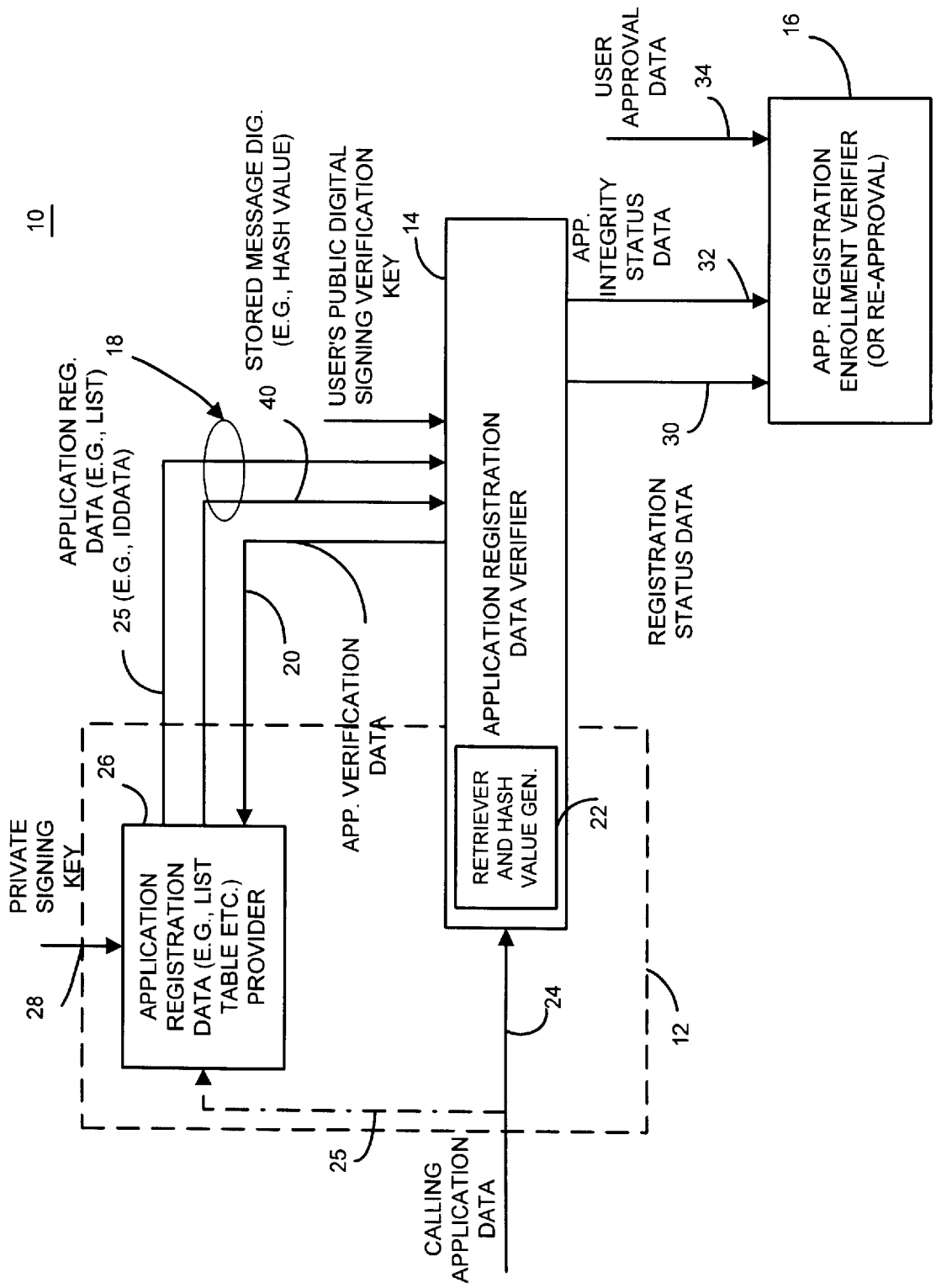
FIG. 1 is a block diagram illustrating one embodiment of an apparatus for controlling application access to limited access based data in accordance with the invention.

Briefly, limited access based data, such as security profile data including user private keys, cryptographic algorithm preferences, user privilege data or other data that is to be protected, is selectively approved for access for multiple software applications based on the application registration data. The application registration data may be, for example, a list of approved applications that are allowed access to the limited access based data. For integrity purposes, the application registration data is digitally signed by, for example, a user's own private signing key, or its integrity may be protected by other suitable mechanisms, for example by a message authentication code (MAC).

An application registration data generator, on a per application basis, generates application registration data that contains at least application identification data, such as, the name of a software application or a pathname to a software application, and stored unique application verification data that is based on executable file data. For example, the unique application verification data may be generated from a one-way hash function applied to an executable file, or part thereof. The verification data may also be generated by non-cryptographic means, such as a checksum or cyclic-redundancy check. In alternate cases, the application identification data may consist of the application verification data itself.

Executable file data may be object code executable by a processing unit or by a software application, scripted code or other code interpretable by a software application, or any other suitable code that influences the behavior of a processing device. A data access determinator determines whether a calling application should be allowed access to the limited access based data by, for example, computing a hash value of the executable file and checking whether this hash value matches the corresponding stored unique application verification data. If there is a match, the application is granted access to the user's cryptographic parameters, privilege data, or other limited access based data on a per application basis.

The application registration data is stored so that an application need not be re-enrolled once it has been approved. In addition, the application registration data may be authenticated by a user's public signing key on a periodic and selectable basis.

In one embodiment, the application registration data is a list of hash values of approved applications. A trusted centralized registration list generator generates the approved application registration data for a plurality of nodes, applications or other communication units. Each relying application unit or computing unit, generates a hash value of a requesting application and evaluates whether the generated hash value matches the centralized registration list.

The application registration data may be pre-generated and signed by a trusted authority to facilitate centralized control and distribution to end users. The application registration list may include, for example, a list of applications so that the centralized authority can dictate only those applications that can be used. This may be desirable, for example, where licensing of applications is important and strict licensure must be maintained. Alternatively, a centralized or noncentralized application registration data list may be customized on a per user basis so that each user has a unique list.

FIG. 1 shows an apparatus 10 for controlling application access to limited access based data. The apparatus 10 may be a suitably programmed computer, such as an IBM PC, or another suitable processing unit. The apparatus 10 includes an application registration data generator 12, an application registration data verifier 14, that serves as a data access determinator, and an application registration enrollment verifier 16

The application registration data generator 12 generates application registration data 18 containing at least application identification data, such as the path and name of the calling application and/or other suitable identification data.

The application registration data generator 12 also generates corresponding unique application verification data 20 through a data retriever and hash value generator 22. The hash value generator 22 receives calling application 24. The calling application data 24 includes location data such as data representing a path where the executable file data is located in memory, such as RAM or ROM. However, any suitable data that can be used to identify the application may be used. The system uses the data representing the path to obtain executable file data to compute a hash value of executable file data associated with the calling application. The hash value generator 22, may be any suitable one-way hash function generator or other algorithm that generates a value as a function of the calling application data.

The application registration data generator 12 includes an application registration data provider 26 that receives the unique application verification data 20 and at least a portion of the calling application data 24, such as application identification data and executable file data. The application registration data provider 26 may be a database or other suitable system that suitably links identification data with stored corresponding unique application verification data. The application registration data generator 12 also receives private signing key data 28 to optionally provide signed application registration data.

The application registration data verifier 14 receives the application registration data 18 to determine application access to the limited access based data, based on the application identification data and stored unique application verification data. The application registration data verifier 14 compares the stored unique application verification data from the application registration data 18 with generated unique application verification data 20 to compare computed hash values. If the unique application verification data 20 and the stored unique application verification data obtained from the application registration data 18 match, access is granted to the limited access based data for the calling application. The limited access data includes, for example, security parameter data used in cryptographic operations, such as private signing keys and private decryption keys in the case of a public/private key crypto system, symmetric keys and/or privilege data. However, it will be recognized that any suitable limited access based data, including non-security data, may be used.

The application registration data verifier 22 evaluates the calling application data and compares the name in the calling application data with stored calling application name data. If they match, the hash value of the calling application is generated using the calling application data as a pointer to the executable file data. The application registration data verifier 14 outputs registration status data 30 and application integrity status data 32 that is used by the application registration enrollment verifier 16. The registration status data 30 is, for example, data representing whether the name and path data (e.g, ID data), of the calling application matches name and path data (application registration list). Application integrity status data 32 is data representing whether or not the computed unique application verification data 20 is the same hash value that is stored as application registration data 18 or if it is a different hash value, indicating perhaps a different version of the program or a rogue application. If the registration status data 30 indicates a match in the names but not a match of the hash values, indicating perhaps a new version of a previously approved application, the user is asked whether to approve the calling application. If neither the names nor hash values match, the user is asked if the application should be approved. Even if both the name and hash values match, a user may still be asked for approval if approval is needed on a per session basis for example. The application registration enrollment verifier 16 also receives user approval data 34 entered by a user (or other application, such as a centralized information security application) to indicate that a particular application has been approved for gaining access to the limited access based data.

Figure 2:
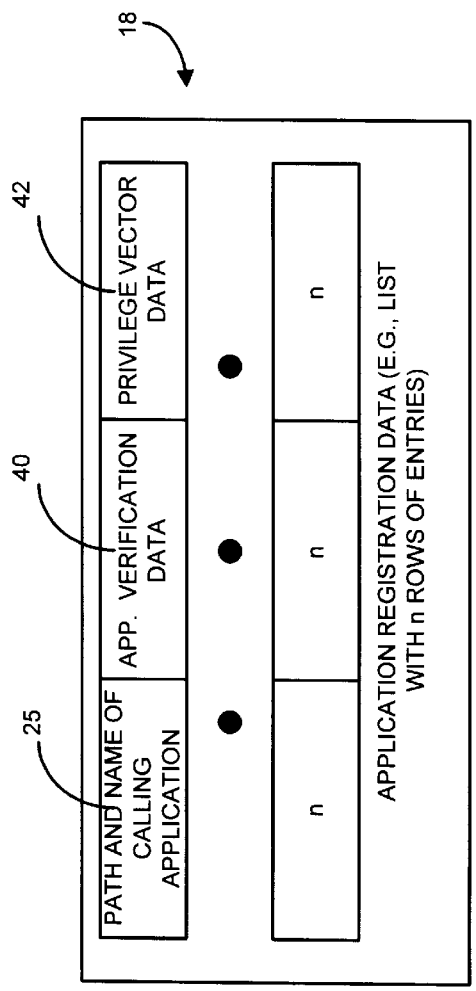
FIG. 2 is a graphic illustration of an embodiment of an application registration list in accordance with one aspect of the invention.

As shown in FIG. 2, the application registration data 18 may include, for example, application identification data 25, stored unique application verification data 40, such as a stored hash value, (also referred to as a stored message digest) based on a hash of the executable file corresponding to the application. Other data may also be included, for example, privilege vector data 42 representing specific privileges associated with the particular calling application. For example, a calling application may only be allowed to access particular keys of the limited access based data in the instance where this data is security parameters. Another example is that the application may only use a specific strength of encryption algorithm employed by a cryptographic system.

The application registration data 18 includes data representing approved applications that are allowed access to the limited access based data. Hence, only allowed applications will have corresponding unique application verification data 40 stored therein. The user's private signing key 28 may optionally be used to digitally sign the application registration data 18 using conventional digital signing techniques, such as generating a hash value of the application registration data and digitally signing the hash value using the private signing key. Alternatively, the digital signature may be performed by a trusted authority that is trusted, for example, through public key certificates by users in the system.

The hash value generator 22 is used both during the initial generation of accepted applications stored as the application registration data 18 and during operation of the system to continually generate hash values of calling applications as calling applications seek access to the limited access based data. However, it would be recognized that separate hash value generator may also be used if desired. The hash value generator 22, as previously mentioned, generates the message digest or unique application verification data 20 for a plurality of executable applications by using a hash function and at least executable file data for each calling application. Hence, the unique application verification data 20 is a function of the executable file data.

Using a one-way hash function provides a unique value for each application or version of calling application. Also, it reduces the amount of data stored as registration data. Alternate functions which associate unique values to different applications could be used in place of a one-way hash function.

Figure 3A:
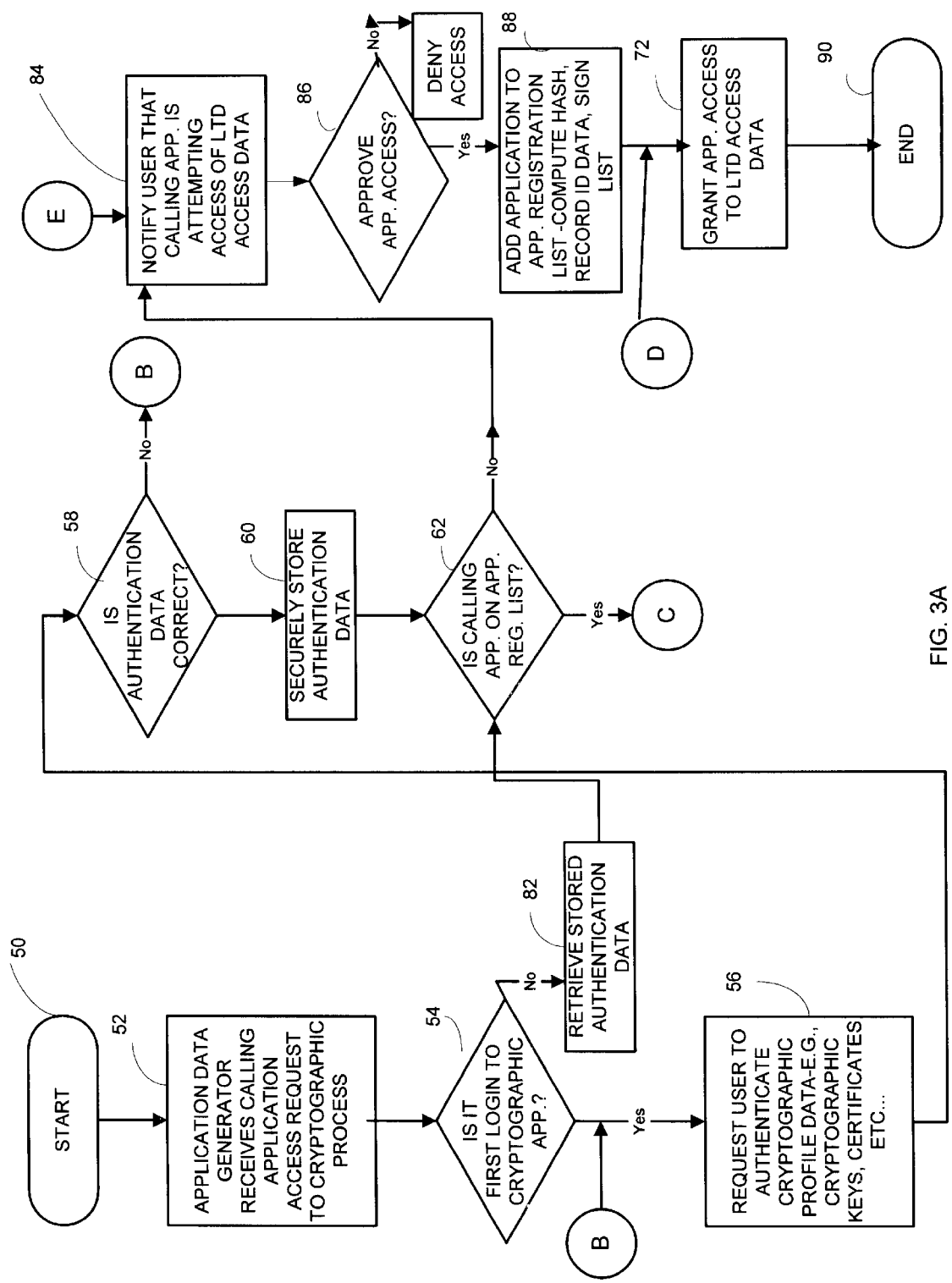
FIG. 3a is a flowchart illustrating an example of one method for controlling application access to limited access based data in accordance with the invention.

Referring to FIG. 3a, a method of operation of the system shown in FIG. 1 will be described. As shown in block 50, the system starts by initializing the registration data (e.g., list). As shown in block 52 the apparatus receives calling application access data 24 and as indicated in block 54 the system determines whether it is the first login to request access to the cryptographic or limited access based data. If it is the first time in a given time period or session that a user or an application wishes to use limited access based data, such as cryptographic signing keys and decryption keys, the system requests the user to authenticate himself to allow access to the secret cryptographic or limited access based data by generating authentication data, as shown in block 56. Authentication is performed, for example, by the user entering a password only known to the user or, for example, using a thumb print scanner or any other suitable authentication mechanism. As shown in block 58, the system determines whether the received authentication data, is correct. If the authentication data is not correct, the system continues to request the user to authenticate himself by re-entering a password or other secret data.

However, if the authentication data is determined to be correct, the system securely stores, for example (encrypts) the authentication data such as the password entered by the user or security profile data which may, for example, be a file with a unique private signing key, a unique private decryption key, cryptographic algorithm preferences or other data for which the user requires limited access to avoid a breach in security. This is shown in block 60. The system then determines whether the calling application or the software application requesting access to the limited access based data appears on the registration list (identified in the application registration data 18). This is shown in block 62. This is determined, for example, based on the application identification data stored as part of the application registration data. A comparison is done between the received application identification data and the list of application identification data stored as application registration data. When received application identification data matches the stored application identification data, the system determines that the calling application is on the list of approved applications.

Optionally, additional verification occurs. As shown in block 64, the system determines if the application registration data is valid by checking its integrity, for example if it has been signed, whether the digital signature is valid. This is done in accordance with conventional public/private key digital signature verification techniques, as known in the art. As shown in block 66, if the digital signature based on the private signing key is not determined to be valid, the system determines the application registration data 18 to be invalid, and discards the registration data. Other mechanisms for providing integrity checking/verification could be used, as will be recognized by one of ordinary skill in the art.

However, if the application registration data signature is valid, the system generates unique application verification data of the calling application as shown in block 68. As shown in block 70, the system compares the computed unique application verification data to the stored unique application verification data in the application registration data 18. If the computed and stored data match, the system grants the application access to the limited access data as shown in block 72. If the computed unique application verification data does not match the stored unique application verification data, the user is notified that the application is listed in the application registration but may have been upgraded or it is potentially a rogue application as indicated in block 74. Hence, although identification data may match indicating that the name of the application is the same, the unique verification registration data indicates that a different calling application is requesting access. The system then prompts the user to determine whether approval is desired so that the application can still grant or obtain access to the limited access based data as shown in block 76. If the user does not indicate approval, access is denied as shown in block 78. However, if the user does approve access, the system updates the requisite entry in the application registration data with the computed application verification data as shown in block 80. The system then grants access to the limited access data. In an alternative embodiment, if the compared values do not match, access to the limited access data is simple denied immediately. As such, the system generates an approval request signal to solicit approval of a calling application, awaits a response and grants or denys access to the limited access data based on the response.

Returning to block 54, if it is not the first login to the cryptographic information, the system retrieves the stored authentication data, such as a password that has been previously entered by the user, or otherwise obtains access to the limited access data as shown in block 82. The system then again determines whether the calling application (e.g., a hash) appears as part of the application registration data as shown in block 62. The application registration data may be in the form of a list, table, summary or any other suitable format. If the calling application is not part of the application registration data, the user is notified that the calling application is attempting access of the limited access data as shown in block 84. The user is then prompted to indicate whether access should be granted to the application as shown in block 86. This may be done, for example, through a graphic user interface. If the user responds indicating that access should be granted, the application is then added to the application registration list as shown in block 88. For example, the system computes application verification data by applying a oneway hash algorithm to executable data corresponding to the calling application and also stores the application identification data (e.g., application name and path) with the computed hash value (message digest) as application registration data in the registration list for example. The registration list may optionally be re-protected for integrity purposes, for example, via a digital signature process as known in the art. Access is then granted to the application and the process ends as shown in block 90 until another application requests access to the limited access data. The system may compare a location of the executable file data with the location of approved executable file data indicated by the application registration data in the list.

Accordingly, the very first time that an application tries to access the limited access data, the application registration data (or list) is empty or may contain a few default applications, such as the core security management application. Alternatively, the application registration data may contain a large number of pre-approved applications or other hashes. The user's signature on the original list may be created at the time of the limited access based data is created. Alternatively, a default or startup list may be signed by a user's trusted certification authority and the certification authority's signature may be verified assuming the user has a trusted verification signature key of that certification authority.

In an alternative embodiment, when a user is prompted by the system to ask whether to approve an application for access, the user may not have any way of checking whether the application is a rogue application since looking at path and name data may provide little assurance that the application has not been tampered with. Consequently, the system provides the computed hash value to an output interface, such as a display device and receives a response through an input interface, such as a keyboard touch screen, voice recognition system or other suitable interface. Where the output interface is a display device, the system visually displays the hash code, or some other digital format, of the executable file. The user then compares the displayed hash code to a trusted hash code obtained elsewhere, for example, on a list of authentic hash codes published on a company's website or other list. As such, the system includes an output interface that outputs the computed hash value and an input interface operative to receive a response indicating whether the computed hash value is part of approved application registration data.

In a preferred embodiment the application registration data is preferably securely stored with the limited access based data but can be stored in a separate location accessible to software applications. Hence the application registration data is encrypted prior to being stored and is decrypted prior to being read. The encryption/decryption may be done by any suitable cryptographic technique. Alternatively, the secure storage may be provided by an integrity protection technique, such as a MAC or digital signature as known in the art, without the requirement for encryption. Other modifications will be evident to those of ordinary skill in the art. For example, the system may prompt a user for approval of an application, not only the very first time an application is invoked, but also the first time that each particular application is invoked within each login session. The user may "click a button" approving access by the application instead of having to reenter a password.

Figure 4:
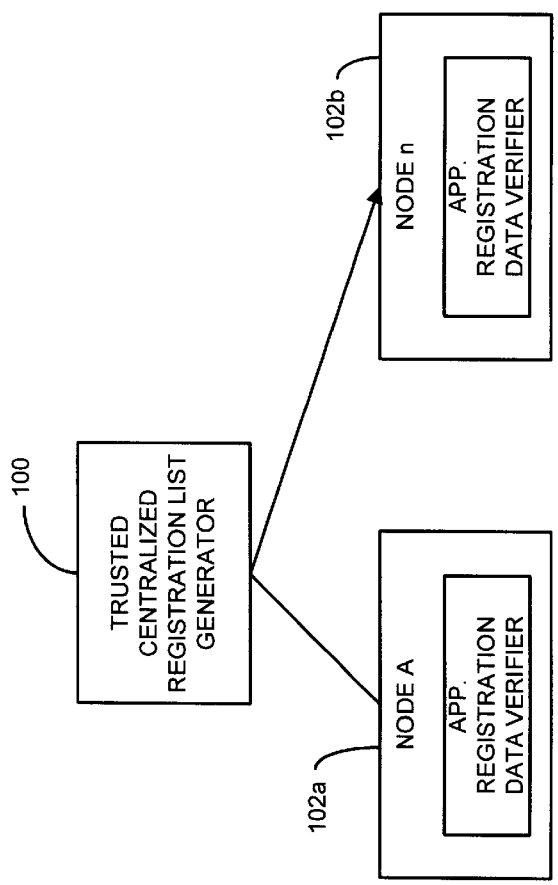
FIG. 4 is a block diagram illustrating a centralized application registration list generator that sends application registration data to nodes which then verify application authorization in accordance with one embodiment of the invention.
Figure 3B:
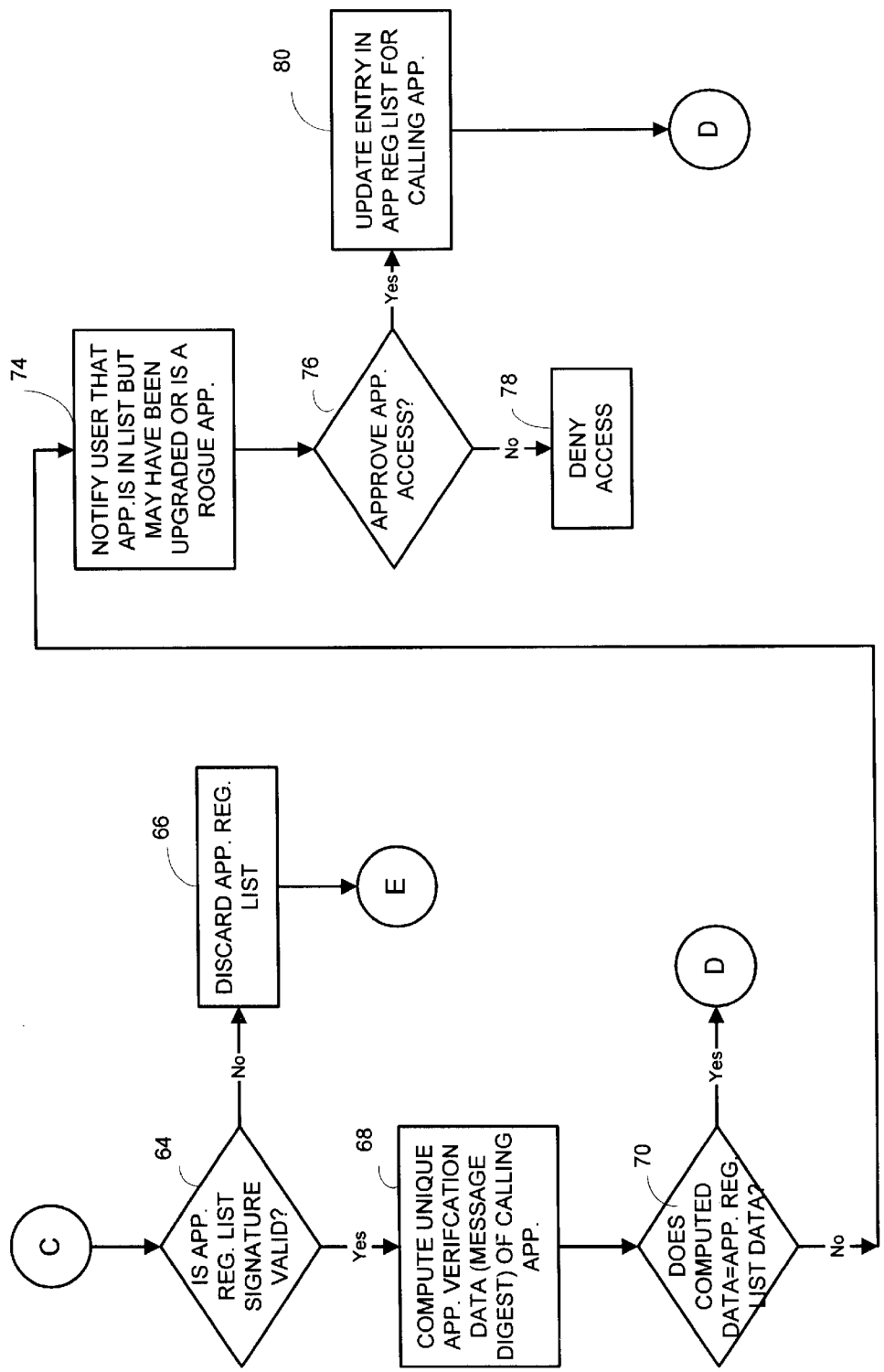
FIG. 3b is a flowchart depicting one example of a method for controlling application access to limited access based data in accordance with the invention.

Referring to FIG. 4, an alternative embodiment including a trusted centralized registration list generator 100 is in operative communication with a plurality of nodes 102a and 102b. The nodes 102a and 102b include, for example, the apparatus 10 except that the application registration data is centrally stored in the trusted centralized registration list generator 100 and not in memory of the nodes. Each node 102a and 102b includes an application registration data verifier, such as application registration data verifier 14 in FIG. 1. The verifiers compare a computed hash value to the stored hash value in the message digest obtained from the trusted centralized registration list generator on a per application basis when an application calls. Alternatively, the centralized registration list may be downloaded once to each node and stored locally and the node then operates as previously described with reference to FIG. 1 and FIGS. 3a–3b except that the application registration data that is stored is not updated by the node since only the trusted centralized list generator may modify the application registration data. The trusted centralized registration list generator 100 is trusted in the sense that the list is digitally signed by the centralized registration list generator and sends the list with a public key certificate of the generator 100. In an alternative embodiment, the list is not digitally signed, but rather obtained from the trusted centralized list generator 100 over an alternate secured channel, such as a secure session based on a session protocol such as SSL as is known in the art.

If desired, the disclosed system can require the user to approve the access of an application for secret data each time the application requests it, since the application automatically evaluates whether or not the application appears on an approval list. Also, applications running in background where the user may not be aware of their operation, are still prevented from getting access to secret information if they do not appear on the list or have not been approved at some point by a user.

The above system may be implemented as software or a combination of hardware and software. Therefore, a storage medium such as a CD ROM, DVD or other suitable storage device may include memory locations containing data representing executable instructions that cause a processing device to perform the above described operations. For example, the executable instruction may generate application registration data containing at least application identification data and corresponding unique application verification data wherein the unique application verification data is based on executable file data; and memory locations containing data representing executable instructions that cause a processing device to determine application access to the limited access based data, based on the application identification data and the unique application verification data, and the other operations as described herein.

It should be understood that the implementation of other variations and modifications of the invention in its various aspects will be apparent to those of ordinary skill in the art, and that the invention is not limited by the specific embodiments described. For example, the term application can include libraries, groups of applications or any suitable access mechanism that uses (directly or indirectly) limited access based data. It is therefore contemplated to cover by the present invention, any and all modifications, variations, or equivalents that fall within the spirit and scope of the basic underlying principles disclosed and claimed herein.

What is claimed is:

1. A method for controlling application access to limited access based data comprising the steps of:
    generating application registration data containing at least application identification data and corresponding unique application verification data wherein the unique application verification data is based on executable file data; and
    determining application access to the limited access based data, based on the application identification data and the unique application verification data.

2. The method of claim 1 including the step of granting application access to the limited access based data based on the application identification data and unique verification data contained in the application registration data.

3. The method of claim 1 wherein the limited access data includes security parameter data used in a cryptographic operation.

4. The method of claim 3 wherein the security parameter data includes cryptographic key data.

5. The method of claim 1 wherein the application registration data further includes location data allowing determination of where the executable file data is located in memory.

6. The method of claim 4 wherein the cryptographic key data includes at least one of a private signing key and a private decryption key.

7. The method of claim 3 wherein the application registration data includes data representing approved applications that are allowed access to the limited access based data.

8. The method of claim 1 including the step of applying digital signature data of a trusted authority to the application registration data.

9. The method of claim 1 wherein the unique application verification data is a function of the executable file data.

10. The method of claim 9 wherein the unique application verification data is derived at least in part by applying a hash function to at least a portion of the executable file data.

11. The method of claim 10 wherein the step of determining application access includes: computing a hash value of at least a portion of executable file data associated with a calling application; and comparing the computed hash value with the unique application verification data in the application registration data.

12. The method of claim 10 wherein the step of determining application access includes: comparing a location of the executable file data with a location of approved executable file data indicated by the application registration data.

13. The method of claim 10 wherein the step of determining application access includes: computing a hash value of at least a portion of executable file data associated with a calling application; providing the computed hash value to an output interface; and receiving a response through an input interface.

14. The method of claim 1 including the steps of:
    generating a user approval request signal to solicit approval of a calling application;
    awaiting a response; and
    granting or denying access to the limited access data based on the response.

15. The method of claim 14 including the step of updating a hash list of approved applications based on the response.

16. An apparatus for controlling application access to limited access based data comprising:
    an application registration data generator that generates application registration data containing at least application identification data and corresponding unique application verification data wherein the unique application verification data is based on executable file data; and
    a data access determinator, operatively responsive to the application identification data and the unique application verification data to determine application access to the limited access based data.

17. The apparatus of claim 16 wherein the data access determinator grants application access to the limited access based data based on the application data and unique verification data contained in the application registration data.

18. The apparatus of claim 16 wherein the limited access data includes security parameter data used in a cryptographic operation.

19. The apparatus of claim 18 wherein the security parameter data includes cryptographic key data.

20. The apparatus of claim 16 wherein the application identification data further includes location data allowing determination of where the executable file data is located in memory.

21. The apparatus of claim 19 wherein the cryptographic key data includes at least one of a private signing key and a decryption key.

22. The apparatus of claim 18 wherein the application registration data includes data representing approved applications that are allowed access to the limited access based data.

23. The apparatus of claim 16 including a digital signature generator that applies digital signature data of a trusted authority to the application registration data.

24. The apparatus of claim 16 wherein the application data generator generates a digital representation of a plurality of executable applications by using a hash function on executable file data corresponding to a plurality of calling applications.

25. The apparatus of claim 16 wherein the unique application verification data is a function of the executable file data.

26. The apparatus of claim 25 wherein the data access determinator computes a hash value of executable file data associated with a calling application, and compares the computed hash value with the unique application verification data in the application registration data to determine whether access should be granted to a calling application, to the limited access data.

27. The apparatus of claim 25 wherein the data access determinator compares a location of the executable file data with a location of approved executable file data indicated by the application registration data.

28. The apparatus of claim 27 including an output interface that outputs the computed hash value and an input interface operative to receive a response indicating whether the computed hash value is part of approved application registration data.

29. A storage medium comprising:
first memory containing data representing executable instructions that cause a processing device to generate application registration data containing at least application identification data and corresponding unique application verification data wherein the unique application verification data is based on executable file data; and
second memory containing data representing executable instructions that cause a processing device to determine application access to the limited access based data, based on the application identification data and the unique application verification data.

30. The storage medium of claim 29 including data representing executable instructions that cause a processing device to grant application access to the limited access based data based on the application data and unique verification data contained in the application registration data wherein the limited access data includes security parameter data used in a cryptographic operation.

31. The storage medium of claim 30 wherein the application registration data further includes location data allowing determination of where the executable file data is located in memory.

32. The storage medium of claim 30 wherein the limited access data includes cryptographic key data including at least one of a private signing key and a private decryption key.

33. The storage medium of claim 30 wherein the application registration data includes data representing approved applications that are allowed access to the limited access based data.

34. The storage medium of claim 30 including data representing executable instructions that cause a processing device to apply digital signature data of a trusted authority to the application registration data.

35. The storage medium of claim 30 including data representing executable instructions that cause a processing device to derive the unique application verification data at least in part by applying a hash function to at least a portion of the executable file data.

36. The storage medium of claim 30 including data representing executable instructions that cause a processing device to compute a hash value of at least a portion of executable file data associated with a calling application; and comparing the computed hash value with the unique application verification data in the application registration data.

37. The storage medium of claim 30 including data representing executable instructions that cause a processing device to compare a location of the executable file data with a location of approved executable file data indicated by the application registration data.

38. The storage medium of claim 30 including data representing executable instructions that cause a processing device to generate an approval request signal to solicit approval of a calling application; await a response; and grant or deny access to the limited access data based on the response.

39. The storage medium of claim 30 including data representing executable instructions that cause a processing device to update a hash list of approved applications based on the response.

40. A method for controlling application access to limited access based data comprising the steps of:
obtaining application registration data containing at least application identification data and corresponding unique application verification data wherein the unique application verification data is based on executable file data; and
determining application access to the limited access based data, based on the application identification data and the unique application verification data.

41. The method of claim 40 including the step of granting application access to the limited access based data based on the application data and unique verification data contained in the application registration data wherein the limited access data includes security parameter data used in a cryptographic operation.

42. The method of claim 41 wherein the security parameter data includes cryptographic key data including at least one of a private signing key and a private decryption key.

43. The method of claim 40 wherein the step of determining application access includes: computing a hash value of at least a portion of executable file data associated with a calling application; and comparing the computed hash value with the unique application verification data in the application registration data.

44. The method of claim 40 wherein the step of determining application access includes: comparing a location of the executable file data with a location of approved executable file data indicated by the application registration data.

* * * * *